(12) United States Patent
Singh et al.

(10) Patent No.: US 9,092,404 B2
(45) Date of Patent: Jul. 28, 2015

(54) SYSTEM AND METHOD TO REMOTELY RECOVER FROM A SYSTEM HALT DURING SYSTEM INITIALIZATION

(71) Applicant: Dell Products, LP, Round Rock, TX (US)

(72) Inventors: Sanjeev Singh, Cedar Park, TX (US); Akkiah Choudary Maddukuri, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 206 days.

(21) Appl. No.: 13/737,359

(22) Filed: Jan. 9, 2013

(65) Prior Publication Data

US 2014/0195854 A1  Jul. 10, 2014

(51) Int. Cl.
*G06F 11/00* (2006.01)
*G06F 11/22* (2006.01)

(52) U.S. Cl.
CPC .................. *G06F 11/2284* (2013.01)

(58) Field of Classification Search
CPC .. G06F 11/1417; G06F 11/2284; G06F 11/22
USPC ............................................. 714/36; 713/1, 2
See application file for complete search history.

(56) References Cited

U.S. PATENT DOCUMENTS

| 5,732,268 | A | * | 3/1998 | Bizzarri ............................ 713/2 |
| 6,393,586 | B1 | * | 5/2002 | Sloan et al. ..................... 714/25 |
| 7,350,111 | B2 | * | 3/2008 | Chen ................................ 714/36 |
| 7,600,110 | B2 | * | 10/2009 | Fu ..................................... 713/2 |
| 2004/0078509 | A1 | | 4/2004 | Malueg et al. |
| 2006/0101194 | A1 | | 5/2006 | Malueg et al. |
| 2007/0076475 | A1 | | 4/2007 | Malueg et al. |
| 2007/0157051 | A1 | | 7/2007 | Hernandez et al. |
| 2010/0070705 | A1 | | 3/2010 | Samuelraj et al. |
| 2014/0195854 | A1 | * | 7/2014 | Singh et al. ..................... 714/36 |

FOREIGN PATENT DOCUMENTS

EP            996061 A2 *  4/2000    ............. G06F 11/14

* cited by examiner

*Primary Examiner* — Philip Guyton
(74) *Attorney, Agent, or Firm* — Larson Newman, LLP

(57) ABSTRACT

An information handling system includes a memory, a processor, and a management controller. The memory includes code to implement a power on self test (POST). The management controller operates to receive an indication that the POST has halted execution in response to a POST error, to log the indication and the POST error, and to send an input to the POST. The POST operates to receive the input and to continue execution based upon the input.

17 Claims, 2 Drawing Sheets

SYSTEM AND METHOD TO REMOTELY RECOVER FROM A SYSTEM HALT DURING SYSTEM INITIALIZATION

FIELD OF THE DISCLOSURE

This disclosure relates generally information handling systems, and relates more particularly to configuring resources in information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
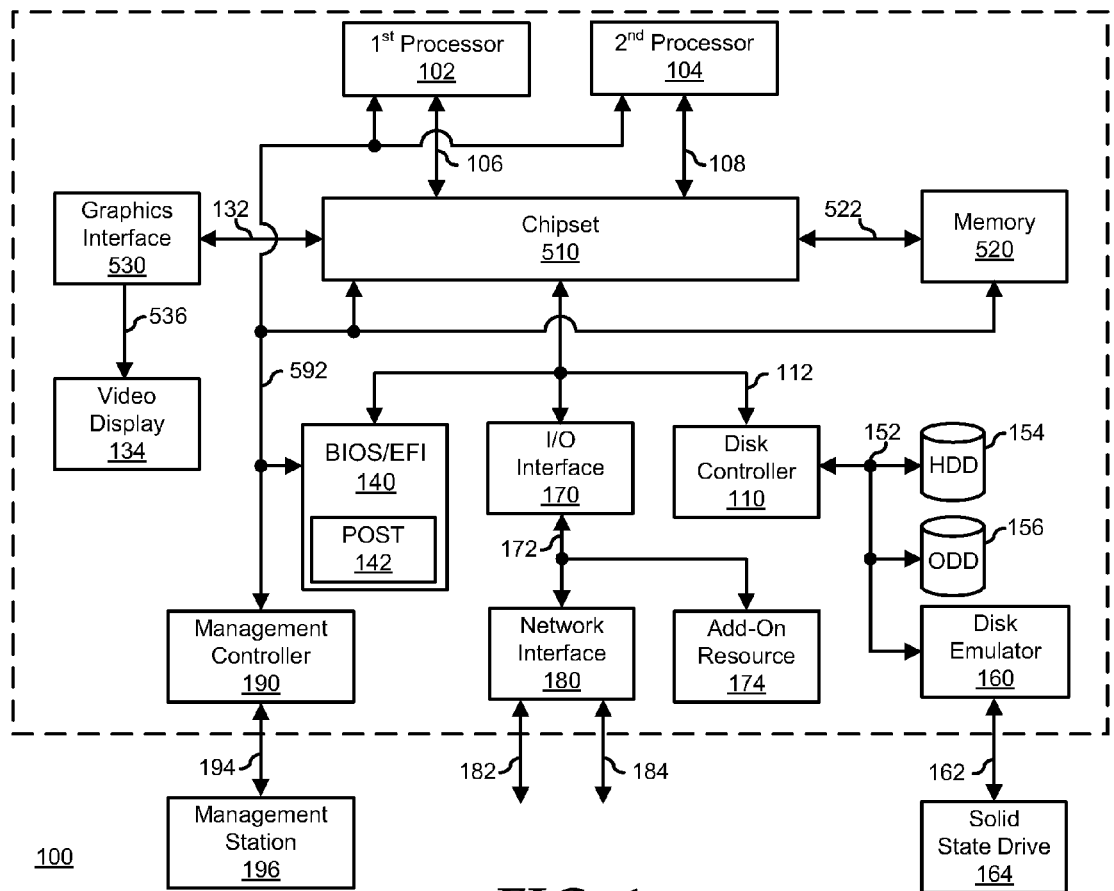
FIG. 1 is a block diagram illustrating an information handling system according to an embodiment of the present disclosure.

FIG. 1 illustrates an information handling system 100. For purpose of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

Information handling system 100 includes a processor and one or more additional processors 104, a chipset 110, a memory 120, a graphics interface 130, include a basic input and output system/extensible firmware interface (BIOS/EFI) module 140, a disk controller 150, a disk emulator 160, an input/output (I/O) interface 170, a network interface 180, and a management controller (MC) 190. Processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

In a particular embodiment, when information handling system 100 boots, BIOS/EFI module 140 executes a power on self test (POST) 142 to initialize and test the resources of the information handling system. When POST 142 detects an error, such as when a resource of information handling system 100 is faulty or misconfigured, the POST indicates the nature of the error by generating a POST diagnostic code that is associated with the error condition. Certain error conditions are handled by POST 142 such that, when these error conditions are encountered, the POST halts execution and displays a prompt on video display 134. The prompt provides a user of information handling system 100 the opportunity to decide how to handle the error condition that caused POST 142 to halt. In response, the user provides an input to information handing system 100 that indicates whether POST 142 should continue execution or whether another routine, such as a BIOS set-up routine, should be executed. For example, video display 134 can provide an indication of the nature of the error condition and prompt the user to enter "F1" to continue execution or to enter "F2" to enter a BIOS set-up routine. In response, the user can provide a response by entering either "F1" of "F2" on a keyboard, and POST 142 can take the appropriate action. Thereafter, POST 142 continues to execute the routine to completion and passes control of information handling system 100 to a boot loader that loads an operating system on the information handling system.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be coupled to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

In a particular embodiment, add-on resource 174 includes an option ROM (not illustrated). The option ROM is a firmware component supplied by the maker of add-on resource 174 and that operates to initialize and configure the add-on resource 174 during boot of information handling system 100. The option ROM extends the functionality of BIOS/EFI module 140 to incorporate the functionality of add-on resource 174 into information handling system 100. As such, the option ROM provides an interface between BIOS/EFI module 140 and add-on resource 174, permitting the BIOS/EFI module to implement functions specific to the add-on resource 174, such as power-on self test, interrupt service, or input/output service calls. The option ROM may be in memory 120, or in a memory of add-on resource 174.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be coupled to external network resources (not illustrated). The network resource can include another information handling system, a data storage system, another network, a grid management system, another suitable resource, or a combination thereof.

MC 190 is connected to processors 102 and 104, chipset 110, memory 120, and BIOS/EFI module 140 via a system communication bus 192. MC 190 may be on a main circuit board (such as a baseboard, a motherboard, or a combination thereof), integrated onto another component such as chipset 110, in another suitable location, or a combination thereof. In a particular embodiment, one or more additional resources of information handling system 100, such as graphics interface 130, video display 134, I/O interface 170, disk controller 150, and network interface 180 are connected to MC 190. MC 190 can be part of an integrated circuit or a chip set within information handling system 100, and can be on a main circuit board, on separate circuit board or add-in card disposed within the information handling system, or a combination thereof. An example of MC 190 includes a baseboard management controller (BMC), an integrated Dell remote access controller (iDRAC), another controller, or a combination thereof. An example of system communication bus 192 includes an inter-integrated circuit ($I^2C$) bus, a system management bus (SMBus), a serial peripheral interface (SPI) bus, a low pin count (LPC) bus, another bus, or a combination thereof.

MC 190 is connected via a network channel 194 to a management system 196 that is external to information handling system 100. Management system 196 operates in conjunction with management controller 190 to provide out-of-band management of information handling system 100. Commands, communications, or other signals are communicated between MC 190 and management system 196 to monitor status of information handling system 100, to control the operations of the resources of the information handling system, and to update the resources. In a particular embodiment, MC 190 is powered by a separate power plane in information handling system 100, so that the MC can be operated while other portions of the information handling system are powered off. In another embodiment, MC 190 is operated during boot of information handling system 100).

In a particular embodiment, when BIOS/EFI module 140 executes POST 142, the POST diagnostic codes are output via system communication bus 192 to MC 190. In addition, POST 142 provides an indication to MC 190 when the execution of the POST is halted due to the detection of the error condition that resulted in the POST being halted. For example, POST 142 can output the POST diagnostic codes to system communication bus 192 by issuing an intelligent platform management interface (IPMI) command to MC 190. In response, MC 190 creates a log of the POST diagnostic codes and the halt indication, and provides an input to information handing system 100 that indicates whether POST 142 or another routine should be executed. In a particular embodiment, MC 190 provides the indication to information handling system 100 by emulating an appropriate key stroke on the information handling system. For example, MC 190 can provide an IPMI command to a keyboard buffer in chipset 110. The IPMI command can include an ASCII code associated with an expected response to the POST halt, and POST 192 can detect the ASCII code and take the indicated action. For example, the IPMI command can include the ASCII code for "F1" to continue execution of POST 142, or the ASCII code for "F2" to execute another routine, such as a BIOS set-up routine. In another embodiment, MC 190 provides the indication by writing to memory 120, and issuing a system management interrupt (SMI) to one of processors 102 or 104, and the processor can direct BIOS/EFI module 140 to invoke an interrupt handler that reads the indication from memory and provides the indication to POST 142. Thereafter, POST 142 continues to execute the routine to completion and passes control of information handling system 100 to the boot loader.

In a particular embodiment, MC 190 operates to provide the POST halt input to information handling system 100 based upon configuration information included in the MC. Here, MC 190 includes a pre-programmed list of the POST diagnostic codes that are associated with the error conditions that cause a POST halt, and a corresponding response that the MC should take for each POST diagnostic code. Then, when MC 190 receives the indication that the execution of the POST 142 is halted, the MC references the log of received POST diagnostic codes to determine which error condition caused the POST to halt, and determines the appropriate response to provide to information handling system 100. In a particular embodiment, management system 196 provides the pre-programmed list to MC 190, and provides periodic updates to the pre-programmed list as needed or desired. In another embodiment, the user can configure the desired response in MC 190, and the MC provides the configuration to BIOS/EFI module 140 as soon as the error code is received.

In another embodiment, when MC 190 receives the POST diagnostic codes and the indication that POST 142 is halted, the MC issues a message via network channel 194 to management system 196, and the management system provides a response to the MC as to which input to provide to information handling system 100. Here, in a particular embodiment, management system 196 displays a prompt to provide a system administrator the opportunity to decide how to handle the error condition that caused POST 142 to halt. In response, the system administrator provides an input to management system 196, and the input gets communicated to MC 190 for inputting to information handling system 100. In another embodiment, when management system 196 receives the message from MC 190, the management system operates to reply to the message based upon configuration information included in the management system. Here, management system 194 includes a pre-programmed list of the POST diagnostic codes similar to the pre-programmed list described above, based upon which the management system determines the appropriate response to provide to MC 190. An example of the types of messages that can be sent include Simple Network Management Protocol (SNMP) messages, Intelligent Platform Management Interface (IPMI) messages, Web Services Management (WSMan) messages, Remote Access Controller Admin (RACADM) messages, other types of messages, or a combination thereof.

Figure 2:
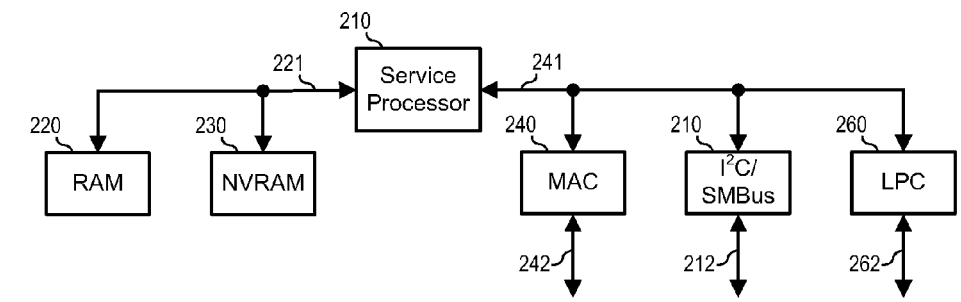
FIG. 2 is a block diagram illustrating a management controller according to an embodiment of the present disclosure.

FIG. 2 illustrates an MC 200 similar to MC 190 that includes a service processor 210, a RAM 220, an NV-RAM 230, a media access control interface (MAC) 240, an I²C/SMBus interface 250, and an LPC interface 260. RAM 220 and NVRAM 230 are coupled to service processor 210 through a memory bus 225. MAC 240, I²C/SMBus interface 250, and SPI interface 260 are coupled to service processor 210 through an I/O bus 245. MAC 240 provides a network channel 242, I²C/SMBus interface 250 provides an I²C bus 252, and LPC interface 260 provides a LPC bus 262. MC 200 functions as a separate microcontroller in an information handling system similar to information handling system 100, providing a dedicated management channel for maintenance and control of resources in the information handling system. As such, the resources in the information handling system are connected to one or more of I²C bus 252 and to LPC bus 262, permitting the MC to receive information from or send information to the resources. MC 200 is also connected to an external network via network channel 242, permitting the MC to receive information from or send information to a management system similar to management system 196. An example of network channel 242 includes an InfiniBand channel, a Fibre Channel, a Gigabit Ethernet channel, a proprietary channel architecture, or a combination thereof.

MC 200 operates to provide out-of-band management of the information handling system. Here commands, communications, or other signals are communicated between MC 200 and the management system to monitor status of the information handling system, to control the operations of the resources of the information handling system, and to update the resources. In a particular embodiment, MC 200 is powered by a separate power plane and can be operated while other portions of the information handling system are powered off. Thus information sent from the management system to MC 200 while the other portions of the information handling system are powered off is stored in RAM 220 or NVRAM 230, and the MC can communicate the information to the appropriate resources when the information handling system is powered on. For example, the management system can send configuration settings for an add-on resource to the MC 200 while the information handling system is powered off, and the MC can save the configuration settings in RAM 220 or in NVRAM 230. Then, when the information handing system is powered on, the configuration settings can be provided to the add-on resource. In this way, an operator can quickly configure multiple information handling systems in a network without having to separately access an option ROM on each information handling system.

In a particular embodiment, when a BIOS/EFI module associated with the information handling system executes a POST, the POST diagnostic codes and the indication that the execution of the POST is halted are output to MC 200 via one or more of I²C bus 252 or LPC bus 262. For example, the POST can output the POST diagnostic codes to MC 200 by issuing an IPMI command on I²C bus 252, or by issuing a keyboard controller style (KCS) transaction on LPC bus 262. MC 200 can likewise reply via an IPMI command on I²C bus 252, or a keyboard controller style (KCS) transaction on LPC bus 262. Where MC 200 operates to provide the POST halt input to the information handing system based upon configuration information included in the MC, the configuration information can be stored in one or more of RAM 220 or NVRAM 230, as needed or desired. Moreover, where a management system provides a pre-programmed list to MC 200, the management system can do so via network channel 242. Likewise, where the management system is involved in providing the output to the information handling system, MC 200 can send and receive SNMP messages via network channel 242.

Figure 3:
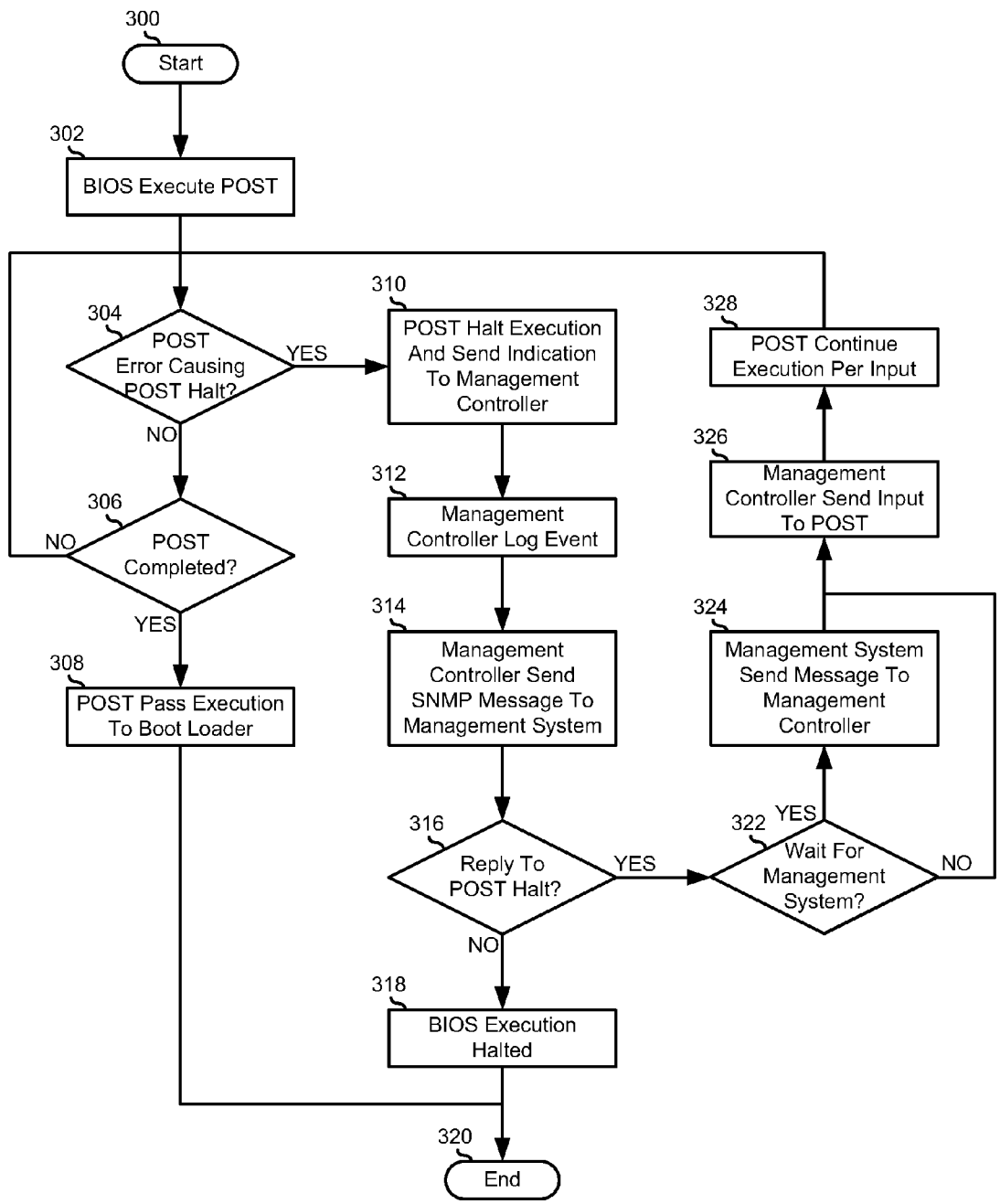
FIG. 3 is a flow chart illustrating a method of remotely recovering from a system halt during system initialization according to an embodiment of the present disclosure.

FIG. 3 illustrates a method of remotely recovering from a system halt during system initialization, starting at block 302. A system BIOS or EFI begins the execution of a POST at block 304. For example, BIOS/EFI module 140 can launch POST 142 when information handling system 100 is booted. A decision is made as to whether or not an error condition has caused the POST to be halted in decision block 304. If not, the "NO" branch of decision block 304 is taken and a decision is made as to whether or not the POST has completed in decision block 306. If not, the "NO" branch of decision block 306 is taken, and the method continues looping back to decision block 304 where a decision is made as to whether or not a error condition has caused the POST to be halted. If the POST has completed, the "YES" branch of decision block 306 is taken, the POST passes execution to a boot loader in block 308, and the method ends at block 320.

Returning to decision block 304, if an error condition has caused the POST to be halted, the "YES" branch of decision block 304 is taken, and the POST is halted and an indication is sent to a management controller that the POST is halted in block 310. For example, POST 142 can send an indication that the POST is halted to management controller 190. The management controller logs the halt event in block 312, and sends an SNMP message to a management system to indicate that the POST has halted and the nature of the error that caused the POST to halt in block 314. A decision is made as to whether or not a reply to the POST halt is to be given from the management system in decision block 316. If not, the "NO" branch of decision block 316 is taken, the BIOS execution is halted in block 318, and the method ends in block 320. If a reply to the POST halt is to be given from the management system, the "YES" branch of decision block 316 is taken, and a decision is made as to whether or not the management controller is configured to wait for a response from the management system in decision block 322. If so, the "YES" branch of decision block 322 is taken, and the management system send a message to the management controller with the reply in block 324. For example, management system 196 can send a message via SNMP, IPMI, WSMan RACADM, or another format. The management controller sends the input to the POST in block 326, the POST continues execution based upon the input in block 328, and the method continues looping back to decision block 304 where a decision is made as to whether or not a error condition has caused the POST to be halted. If the management controller is not configured to wait for a response from the management system, the "NO" branch of decision block 322 is taken and the method proceeds to block 326 where the management controller sends the input to the POST.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a memory including code to implement a power on self test (POST);
   a processor operable to execute the POST; and
   a management controller operable to:
      receive a first indication that the POST has halted execution in response to a POST error;
      log the first indication and the POST error; and
      send an input to the POST, wherein in sending the input the management controller is further operable to:
         write a second indication to a memory of the information handling system; and
         provide a management interrupt to the processor, the system management interrupt invoking an interrupt handler that reads the second indication from the memory;
   wherein the POST is operable to receive the input and to continue execution based upon the input.

2. The information handling system of claim 1, wherein the management controller is further operable to:
   send the input to the POST based upon configuration information included in the management controller.

3. The information handling system of claim 2, wherein the configuration information includes an association between the POST error and the input.

4. The information handling system of claim 1, wherein the management controller is further operable to:
   send a second indication to a management system;
   receive the input from the management system in response to sending the second indication; and
   send the input to the POST in response to receiving the input from the management system.

5. The information handling system of claim 4, wherein the input is provided at the management system based upon an action of a system administrator.

6. The information handling system of claim 4, wherein the input is provided at the management system based upon configuration information included in the management system.

7. A method comprising:
   executing, at an information handling system including a processor, a power on self test (POST);
   identifying by the POST a POST error;
   sending by the POST a first indication of the POST error and a second indication that the POST has halted, wherein the first and second indications are sent to a management controller of the information handling system;
   logging by the management controller the first and second indications;
   sending an input to the POST;
   receiving the input at the POST;
   continuing execution of the POST in response to receiving the input;
   sending a third indication to a management system;
   receiving the input from the management system in response to sending the third indication; and sending the input to the POST in response to receiving the input from the management system.

8. The method of claim 7, wherein, in sending the input to the POST, the method further comprises:
writing, by the management controller, a third indication to a memory of the information handling system; and
providing a system management interrupt to a processor of the information handling system, the system management interrupt invoking an interrupt handler that reads the third indication from the memory.

9. The method of claim 7, wherein sending the input to the POST is based upon configuration information included in the management controller.

10. The method of claim 9, wherein the configuration information includes an association between the POST error and the input.

11. The method of claim 7, wherein the input is provided at the management system based upon an action of a system administrator.

12. The method of claim 7, wherein the input is provided at the management system based upon configuration information included in the management system.

13. A non-transitory computer-readable medium including code for implementing a method, the method comprising:
executing a power on self test (POST);
identifying by the POST a POST error;
sending by the POST a first indication of the POST error and a second indication that the POST has halted, wherein the first and second indications are sent to a management controller;
logging by the management controller the first and second indications;
sending an input to the POST;
receiving the input at the POST;
continuing execution of the POST in response to receiving the input;
sending a third indication to a management system;
receiving the input from the management system in response to sending the third indication; and
sending the input to the POST in response to receiving the input from the management system.

14. The computer-readable medium of claim 13, wherein, in sending the input to the POST, the method further comprises:
writing, by the management controller, a third indication to a memory; and
providing a system management interrupt, the system management interrupt invoking an interrupt handler that reads the third indication from the memory.

15. The computer-readable medium of claim 13, wherein sending the input to the POST is based upon configuration information included in the management controller.

16. The computer-readable medium handling system of claim 15, wherein the configuration information includes an association between the POST error and the input.

17. The computer-readable medium of claim 13, wherein the input is provided at the management system based upon an action of a system administrator.

* * * * *